(12) United States Patent
Krahn et al.

(10) Patent No.: US 9,724,975 B2
(45) Date of Patent: Aug. 8, 2017

(54) HOLDING ELEMENT FOR A SPRING

(71) Applicant: ZF Friedrichshafen AG, Friedrichshafen (DE)

(72) Inventors: Stefan Krahn, Osnabrück (DE); Thomas Rupflin, Stetten (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/914,273

(22) PCT Filed: Aug. 6, 2014

(86) PCT No.: PCT/EP2014/066944
§ 371 (c)(1),
(2) Date: Feb. 25, 2016

(87) PCT Pub. No.: WO2015/032576
PCT Pub. Date: Mar. 12, 2015

(65) Prior Publication Data
US 2016/0207369 A1 Jul. 21, 2016

(30) Foreign Application Priority Data

Sep. 5, 2013 (DE) .......... 10 2013 217 769

(51) Int. Cl.
*B60G 7/00* (2006.01)
*F16F 1/26* (2006.01)
(Continued)

(52) U.S. Cl.
CPC ............ *B60G 7/008* (2013.01); *B60G 7/001* (2013.01); *F16F 1/26* (2013.01); *F16F 1/3686* (2013.01);
(Continued)

(58) Field of Classification Search
CPC .... F16F 1/26; F16F 1/28; F16F 1/3683; F16F 1/3686; F16F 7/123; B60G 2202/114;
(Continued)

(56) References Cited

U.S. PATENT DOCUMENTS 4,781,364 A * 11/1988 Finn ..................... B60G 11/181
267/260
4,969,634 A * 11/1990 Bellingham .......... F16F 1/3686
267/260

(Continued)

FOREIGN PATENT DOCUMENTS

DE   10 2011 081 693 A1   2/2013
JP   H07-112607 A         5/1995

OTHER PUBLICATIONS

German Search Report Corresponding to 10 2013 217 769.0 mailed May 23, 2014.

(Continued)

*Primary Examiner* — Vishal Sahni
(74) *Attorney, Agent, or Firm* — Davis & Bujold, PLLC; Michael J. Bujold

(57) ABSTRACT

A holding element for a spring, having a spring fastening area (10) for fastening the leaf spring (2) to the holding element (5) and a wheel carrier fastening area (9) for fastening a wheel carrier (4) to the leaf spring (2). The holding element (5) has a deformation zone (23) through which webs and openings extend for transmission of forces from the spring fastening area (10) to the wheel carrier fastening area (9), such that the webs (S2.1, S2:2, S3.1, S3.2) and the openings (A1, A2, A3) are formed mirror-symmetrically relative to the longitudinal axis (L) of the holding element.

18 Claims, 7 Drawing Sheets

(51) Int. Cl.
*F16F 1/368* (2006.01)
*F16F 7/12* (2006.01)

(52) U.S. Cl.
CPC .......... *F16F 7/12* (2013.01); *B60G 2204/143* (2013.01); *B60G 2206/016* (2013.01); *B60G 2206/71* (2013.01); *B60G 2206/8101* (2013.01)

(58) Field of Classification Search
CPC .... B60G 2204/121; B60G 11/08; B60G 11/10
See application file for complete search history.

(56) References Cited

U.S. PATENT DOCUMENTS

| | | | |
|---|---|---|---|
| 9,115,778 B2* | 8/2015 | Wagner | B60G 11/08 |
| 2013/0241167 A1 | 9/2013 | Perri et al. | |
| 2014/0042680 A1* | 2/2014 | Glover | F16F 1/368 |
| | | | 267/158 |

OTHER PUBLICATIONS

International Search Report Corresponding to PCT/EP2014/066944 mailed Oct. 27, 2014.
Written Opinion Corresponding to PCT/EP2014/066944 mailed Oct. 27, 2014.

* cited by examiner

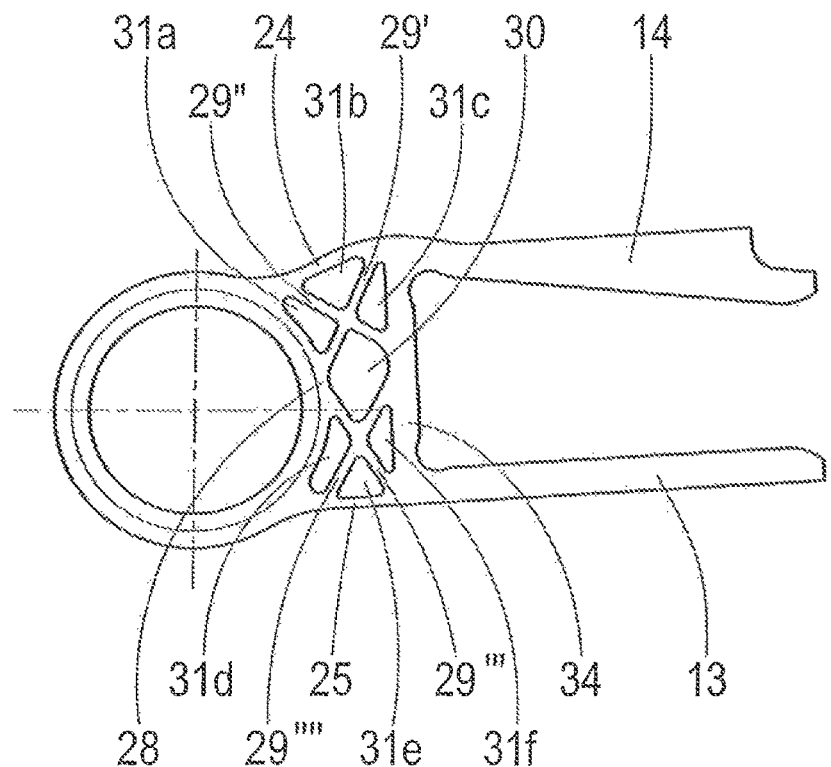
PRIOR ART Fig. 2a
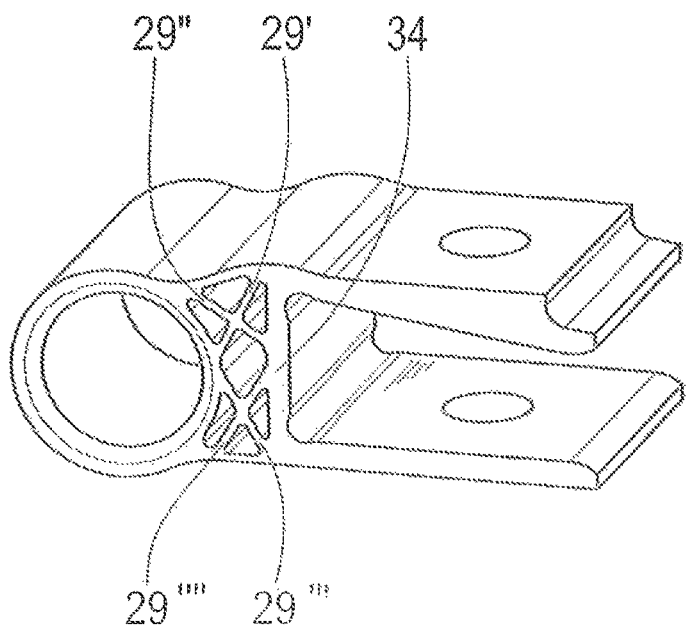
PRIOR ART Fig. 2b

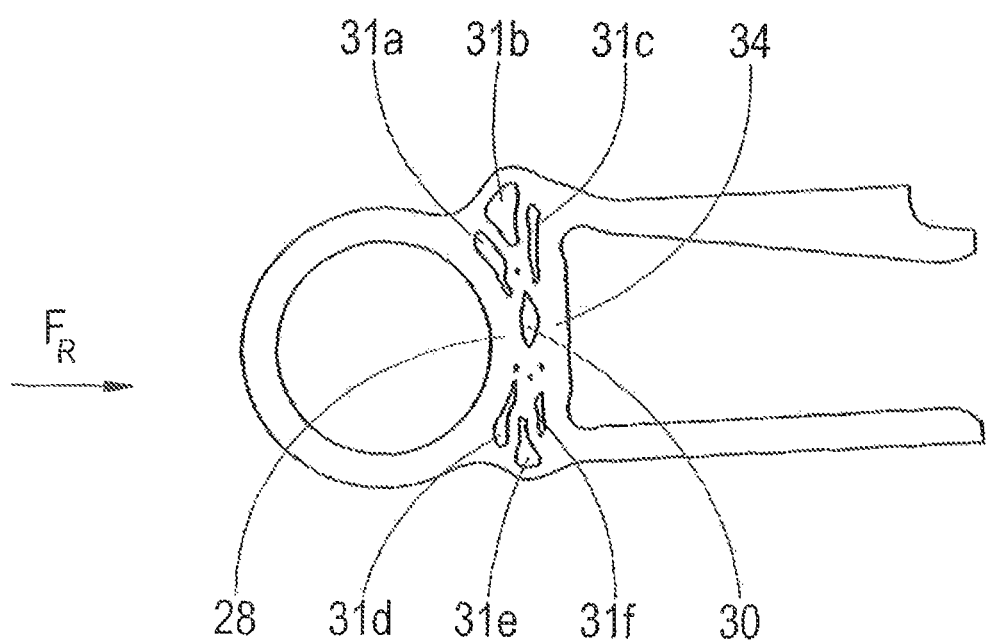
PRIOR ART Fig. 2c

HOLDING ELEMENT FOR A SPRING

This application is a National Stage completion of PCT/EP2014/066944 filed Aug. 6, 2014, which claims priority from German patent application serial no. 10 2013 217 769.0 filed Sep. 5, 2013.

FIELD OF THE INVENTION

The invention concerns a holding element for a spring, in particular a leaf spring, with a spring fastening area for fastening the leaf spring to the holding element and a wheel carrier fastening area for fastening a wheel carrier to the leaf spring, such that the holding element comprises a deformation zone through which webs and openings extend for the transmission of forces from the spring fastening area to the wheel carrier fastening area. In addition the invention relates to a use of the holding element and to a method for producing a holding element.

BACKGROUND OF THE INVENTION

Springs, such as leaf springs, are often used in chassis for the sprung suspension of wheels in order to compensate for bumpiness of the road and thereby improve the driving characteristics of a vehicle. For this, the wheels or wheel carriers to which the wheels can be attached are connected to the vehicle body by control arms and springs. Leaf springs can also guide and hold the wheels and/or wheel carriers, so that the wheels are positioned in a controlled position relative to the chassis and/or the vehicle body.

In the prior art the leaf springs are connected to the wheel carriers so that transverse forces or lateral forces acting on the wheels can be transferred to the leaf spring.

From DE 10 2011 081 693 A1 holding elements for wheel-guiding leaf springs are known, which can absorb transverse and lateral forces. Moreover, in a deformation zone very large forces can be absorbed, which can be produced during a side-impact.

SUMMARY OF THE INVENTION

An objective of the present invention is to provide an improved holding element.

That objective is achieved by a holding element as described below.

The objective is achieved by a holding element for a spring, having a spring fastening area for fastening the leaf spring to the holding element and a wheel carrier fastening area element for fastening a wheel carrier to the leaf spring, wherein the holding element comprises a deformation zone through which webs and openings extend, for the transmission of forces from the spring fastening area to the wheel carrier fastening area. The arrangement is characterized in that the webs and openings are positioned mirror-symmetrically relative to the longitudinal axis of the holding element.

Here, the wheel carrier fastening area is the area of the holding element that serves for fastening the wheel carrier to the holding element. The wheel carrier fastening area can also be connected to the wheel carrier by way of a number of further elements. The spring fastening area serves for fastening the leaf spring or spring to the holding element. This area too need not be directly connected to the spring, but rather, here too one or more other elements can be arranged between the holding element and the spring. Preferably however, the holding element is made integrally and the wheel carrier and spring are connected directly to the holding element.

Instead of connecting the spring directly to the wheel carrier, a separate holding element is associated with the spring by way of which the spring is connected to the wheel carrier. In this case it is not necessary for the wheel carrier to be connected directly to the holding element. Rather, designs are also conceivable in which one or more elements are arranged between the wheel carrier and the holding element.

The spring can in particular be in the form of a leaf spring, preferably a transverse leaf spring. A leaf spring is understood to be a spring whose main extension direction differs from the preferred springing direction, in particular the main extension direction is essentially perpendicular to the preferred springing direction.

The leaf spring can consist of one or more materials, in particular metal and/or plastic. Preferably the leaf spring and/or transverse leaf spring is made of a fiber-reinforced composite (FRC) material, preferably glass-fiber-reinforced plastic. With the last-mentioned material, the spring cannot be readily joined to connecting components. It should be borne in mind that drilling through FRC affects the properties of the material, and simply bolting the end of a drilled-through leaf spring for example to a wheel carrier will not sufficiently withstand the wheel loads, especially the transverse forces. A holding element encloses the spring, so that despite destroying the fiber structure, drilling of the FRC spring in order to produce a high-load-bearing connection by virtue of the holding element is possible. Alternatively, during its production the spring can be perforated in the area where it is to be fastened, so that the fiber structure is not destroyed despite the fixing hole in the spring.

In particular, the holding element is so designed that during an energy input as a result of which the spring could be damaged, for example by a lateral or transverse force produced by abusive misuse of the wheel carrier, the holding element is deformed selectively in such manner that the energy introduced is at least partially attenuated within the holding element itself and only part of the energy introduced is transmitted to the spring. This prevents damage to the spring. Preferably, the deformation of the holding element is of a shape and extent such that the spring remains connected to the wheel carrier and the wheel can therefore still be guided by the spring, thereby allowing driving to continue despite the deformation. Preferably also, buckling of the wheel carrier fastening area relative to the spring fastening area should be prevented so that only lateral forces are transmitted.

The force by which the spring could be damaged can be determined with reference to the size, direction, duration etc. of the force. It is also possible to adapt the holding element in such manner that damage to other components, in particular ones associated with the spring such as mountings, is prevented.

Particularly preferably, however, the deformation of the holding element can be clearly perceived from the driving behavior of the vehicle and/or is even visible, so that the driver of the vehicle is made aware of the damage to the holding element by the driving behavior of the vehicle and is therefore motivated to eliminate the damage. Thanks to the deformation of the holding element damage to the spring is prevented, so that in the event of damage only the holding element has to be replaced and the usually much more expensive spring itself can be retained.

Preferably, by virtue of the deformation of the holding element the position where the wheel carrier is fastened to the holding element is displaced relative to the fastening of the spring to the holding element, so when the holding element is in use the wheel position, such as its tracking and/or its camber, is visibly altered and this can be seen from outside by the driver.

Preferably, the holding element is made of a metal such as steel and/or a light metal such as aluminum, in particular in the form of a continuously-cast component. However, holding elements made of composite materials such as fiber-reinforced plastic, in particular glass-fiber-reinforced plastic, are also conceivable.

The deformation zone is designed in such manner that under low lateral forces or standard loading conditions it behaves elastically, so that during normal operation no permanent changes of the wheel position take place. When excessive loads occur plastic deformation takes place if a force that exceeds a certain limit value (lateral force greater than in the standard loading case), and in particular which could result in damage to the spring, is transmitted from the wheel carrier fastening area to the spring fastening area. The holding element can be deformed by lateral forces in such manner that when the forces transmitted are within the standard loading condition, the holding element deforms hardly at all or only elastically to a small extent, so that stable and constant guiding of the wheels is enabled. But if a force is introduced into the holding element which is large enough for the spring to be permanently damaged (an abusive, misusing force), then the deformation zone of the holding element is plastically deformed and due to the plastic deformation the energy is dissipated and not transmitted onward to associated components such as the spring.

Preferably, by virtue of the deformation in the deformation zone the wheel carrier fastening area moves closer to the spring fastening area. Due to the deformation the position of the wheel carrier relative to the spring can change. Due to the changed position of the holding element the wheels can move to a toe-in or toe-out position, or indeed the wheel camber can change, depending on how the holding element is fastened to the wheel carrier. This results in noticeably altered driving behavior or to a change of the wheel position relative to the vehicle body that can be seen from outside.

The deformation zone is arranged in such manner that a force transmitted from the wheel carrier fastening area to the spring fastening area is transferred by way of the deformation zone. In particular, the deformation zone connects the wheel carrier fastening area to the spring fastening area.

In the main extension direction of the spring, the deformation zone is between the wheel carrier fastening area and the spring fastening area. The spring fastening are is the area where the spring is fastened to the holding element. In its fastening area the spring can be surrounded by the holding element and thus held on several sides. In addition, in the fastening area the holding element can be connected detachably or permanently to the spring by friction force and/or with interlock by some attachment means, such as a screw-bolt, a rivet or even a clamp. The wheel carrier fastening area is the area where the holding element is designed such that it can be connected indirectly or directly to the wheel carrier. The arrangement of the deformation zone between the wheel carrier fastening area and the spring fastening area, preferably along the main extension direction of the spring, enables the holding element to be designed such that it acts as an extension of the spring. This enables the holding element also to be used in spring designs or chassis in which previously no, or no such holding element is provided, since the holding element can extend in the direction of the spring and thus continue the shape of the spring.

It is also possible, however, in the main extension direction of the spring, to arrange the wheel carrier fastening area alongside or offset relative to the spring fastening area and thus to enable the spring to be accommodated in a variety of fitting spaces.

The invention is characterized in that relative to its longitudinal axis the holding element is designed mirror-symmetrically. This is particularly the case in the area of the deformation zone and the wheel carrier fastening area. Largely, however, this also applies to the spring fastening area. In the deformation zone in particular, the webs and openings are formed mirror-symmetrically relative to the longitudinal axis of the holding element. Here, mirror-symmetrically means in particular that the upper half of the holding element would come to coincide with the lower half if it were swiveled about or reflected in the longitudinal axis. Thanks to the uniform arrangement of the webs and openings an overall homogeneous component is produced, which has advantages during the loading with lateral or transverse forces already mentioned earlier when such forces act from the wheel side upon the spring. More details will be given later about the arrangement of the webs and openings.

Owing to the mirror-symmetrical design of the holding element the outer contour of the holding element is also mirror-symmetrical relative to the longitudinal axis. This is particularly the case in the forward area of the holding element, which faces away from a first separating wall. Essentially, the mirror-symmetry also applies to the outer contour of the holding element in the spring fastening area, since the outer contour of the webs, which also surround the spring or leaf spring, is designed substantially symmetrically. The symmetrical arrangement of the outer contour is only interrupted by holes or bores, which can be present in at least one of the webs. This depends on the fastening variant used in each case. As already said earlier, for example a screw-bolt connection can be used. With a through-going screw-bolt connection bores in both webs are needed. If as the fastening variant a clamp or a screw on one side only is used, then the outer contour of at least one web in the spring fastening area is interrupted by a through-hole. In a preferred embodiment the webs in the spring fastening area are arranged only approximately mirror-symmetrically. If the spring fastening area is approximately wedge-shaped so that the diameter of at least one web of the spring fastening area decreases from the first separating wall toward the end of the at least one fastening web, a wedge-shaped interlock with the also wedge-shaped end of the spring can be produced. In this case a web is shaped such that its inner contour forms a wedge with its outer contour, in particular a wedge with a gradient of 5°. It has been shown that with an interlock having such a wedge shape, simple screwing of the end of the leaf spring is sufficient. It is understood that for assembly purposes the wedge-shaped end of the leaf spring must be introduced laterally into the holding element in order then to secure it by means of the single screw. By virtue of the front inner surface of the separating wall facing toward the spring, the spring can rest in the transverse direction against the holding element. Thanks to the wedge-shaped interlock, the end of the spring is held securely in the holding element.

Preferably, in the front area of the holding element, i.e. in that part which faces away from the spring fastening area, the outer contour is designed such that it has two raised portions facing away from the longitudinal axis and between them a depression facing toward the longitudinal axis. This means that the diameter of the holding element measured perpendicularly to the longitudinal axis, in the area where the spring is fastened, is at first uniform but then, from about the first separating wall, increases in the direction toward the wheel carrier fastening area. The steady diameter increase is given by a raised portion, which having regard to the outer contour can also be called a peak. Beyond the raised portion the diameter decreases uniformly and thus forms a trough. Beyond the trough the diameter increases again, preferably not to the same extent as the first raised portion, and then decreases again so that the outer contour also decreases uniformly and follows parallel to the inner contour of the opening in the wheel carrier fastening area. In other words, starting from the fastening webs in the spring fastening area, the aforesaid raised portions extend in a wave shape with two peaks and a trough between them. Thus, the outer part of the holding element is formed by the webs in the fastening area, which encounter the first separation wall and are connected thereto, and on which further outer webs with the aforesaid contour extend, which are wave-shaped and then merge into the wheel carrier fastening area. The wheel carrier fastening area is formed by an opening and is a round, in particular circular opening like a bearing eye of the type known for example from vehicle chassis control arms.

It has already been said previously that the deformation zone is provided in order to absorb lateral forces. In particular the deformation zone should deform plastically when the standard loading condition is exceeded. The particular shape of the outer contour is chosen such that when acted upon by a lateral force the deformation zone deforms plastically in a selective manner. In particular, the wave-like arrangement of the outer webs and the shape of the outer contour enable a selective absorption of forces applied from the wheel side. Particularly in collaboration with the arrangement of the webs and openings this is advantageous, as will be described in more detail later. Thanks to the special arrangement of the webs and openings and the choice of outer contour, buckling of the front portion of the holding element, i.e. the wheel carrier fastening area and the deformation zone relative to the spring fastening area, is prevented so that the guide mounting held by the opening remains on the longitudinal axis. In other words the holding element is so designed that depending on the load, a particular deformation path is defined. Bucking is understood to be a movement transversely to the longitudinal axis, such that in an extreme case the wheel carrier fastening area could even move around the other area or even be sheared off, which the present holding element is designed to avoid.

Preferably, the webs are arranged between the wheel carrier fastening area and the spring fastening area whereas the openings extend at least partially into the wheel carrier fastening area. The spring fastening area is separated from the other two areas by the first separating wall. The deformation zone is located between the first separating wall and the second separating wall, which ends before the opening. The actual wheel carrier fastening area extends starting from the second separating wall, by way of the opening, to the wheel-side end of the holding element. When openings extend partially into the wheel carrier fastening area, this means that the openings are not arranged exclusively between the first and second separating walls, but extend beyond the second separating wall in the direction toward the wheel carrier fastening area. Thanks to this as well, depending on the load a particular deformation path is produced. In this context, when deformation is mentioned this means in the first instance the deformation in the direction of the longitudinal axis. Besides the deformation in the transverse direction due to the action of transverse forces, it is however also advantageous if some areas of the holding element can move transversely to the longitudinal axis in the vertical direction. Besides being favored by the shape of the outer contour and outer webs, this is also favored if the openings extend partially into the wheel carrier fastening area.

Preferably, in the deformation zone the webs form a cross such that two of the webs extend from a common crossing point at first approximately in the vertical direction. The webs then end as if at an opening and then continue in the direction of the second separating wall, into which they merge. Two of the webs extend from the crossing point at an angle of about 45° relative to the longitudinal axis toward the first separating wall, the crossing point lying on the longitudinal axis. Thanks to the special arrangement of the struts the holding element can be designed such that it can absorb high forces from various directions so as to enable a stable positioning of the spring relative to the wheel carrier. As already explained, the struts and their particular arrangement enable a defined deformation of the deformation zone when it is exposed to high lateral or transverse forces. Thanks to the arrangement of the first and second separating walls of the outer and inner webs, a structure is produced which particularly by virtue of its symmetrical arrangement, enables a particular load-dependent deformation path.

Preferably, the vertical portion of the webs and the webs projecting in the direction of the second separating wall have approximately equal material thickness, in particular actually equal material thickness. The material thickness of the struts is understood to be their cross-section or width. The shape and cross-section of the struts are adapted to the force to be transmitted. In particular, the directions of the struts enable a preferred force input so that after the action of lateral forces the opening moves along the longitudinal axis toward the spring. In this case the struts are designed such that when a lateral force acts upon the wheel carrier fastening area, the vertical part of the webs act as tensile struts and the webs projecting in the direction toward the first separating wall act as compression struts. By virtue of the design of the vertical webs as tensile struts, when lateral forces act upon the wheel carrier fastening area a deformation takes place, which is approximately and in particular actually transverse to the longitudinal axis. The webs that extend at an angle of about 45° relative to the longitudinal axis in the direction toward the first separating wall enable a deformation both in the direction of the longitudinal axis and also in the direction transverse to the longitudinal axis. Thus, the arrangement of webs contributes toward allowing movement of the opening or the wheel carrier along the longitudinal axis in the direction toward the spring or spring fastening area.

Preferably, starting from the crossing point and as far as the first separating wall an opening in the shape of an approximately equilateral triangle is formed, one side of which extends approximately vertically and parallel to the first separating wall. Thus, the triangular opening is bounded by the separating wall and the two inward-projecting webs. This shape of opening also contributes toward the preferred deformation movement along the longitudinal axis of the holding element.

Preferably, on the side facing away from the triangle and between the second separating wall and the vertical webs a circular-segment-like opening is formed and delimited by them, such that starting from the ends of the vertical webs a circular section extends in the direction of the wheel carrier fastening area. The vertical width of the circular-segmentlike opening corresponds approximately to the vertical width of the triangular opening or that of the triangle bounded by the webs. This is an opening formed between the triangular opening and the opening of the wheel carrier fastening area. Clearly, when a transverse force is acting the diameter of the circular-segment-like opening decreases. With this shape of opening as well, a deformation movement along the longitudinal axis is forced. Preferably, the circular section has a shape such that the circular section runs parallel to the outer contour of the holding element and/or parallel to the contour of the opening in the area of the longitudinal axis.

In a further preferred embodiment two openings extend beginning from the wheel carrier fastening area approximately parallel to the outer contour of the holding element as far as the deformation zone, such that the openings extend as far as an area between the vertical webs and the webs that project in the direction of the first separating wall. The openings are again arranged symmetrically relative to the longitudinal axis. These openings extend from the deformation zone into the wheel carrier fastening area, and their inner contour, which faces away from the longitudinal axis, runs partially parallel to the outer contour, particularly in the area of the wave-shaped outer contour, so that they run parallel to the two raised portions and the one depression in the outer contour. The openings have an approximately tubular shape such that the diameter along the outer contour can vary or can extend uniformly over the length of the opening. These openings are also involved in preventing a previously mentioned buckling from taking place in the deformation zone. Thanks to the openings, the webs that extend on the outside of the holding element deform selectively under the action of a longitudinal force and enable the web material on the outside to move out of the way transversely to the direction of the longitudinal axis.

In a preferred embodiment, into the previously mentioned openings there projects in each case an end-stop arranged mirror-symmetrically relative to the longitudinal axis between the vertical webs and the web extending obliquely backward in the direction of the first separating wall, which stop cooperates with the respective vertical web, in particular its end area, when a lateral force acts upon the wheel carrier fastening area. Preferably, the stop is connected to the outer web in each case and is formed integrally with it, such that the outer contour of the stop and the inner contour between the vertical web and the web projecting toward the first separating wall extend approximately parallel to one another. In other word the contours (inner contour and outer contour) form the points of a double arrow. When a lateral—or transverse—force acts upon the wheel carrier fastening area along the longitudinal axis a deformation takes place within the deformation zone, such that with increasing deformation at least one vertical web comes into contact with the respective stop close to it. Depending on the action or direction of the force, by virtue of the stop in combination with the vertical web buckling of the wheel carrier fastening area or deformation zone relative to the spring fastening area is effectively prevented. Even if the force acting, or its direction, deviate from the longitudinal axis of the holding element in such manner that at first only one stop comes into contact with one web, whereas the other vertical web is not yet in contact with the other stop, then with further plastic deformation there takes place, as it were, a rotation or tilting about the already active stop or point of contact, such that with further plastic deformation rotation takes place about that point in the opposite direction until the other vertical web comes into contact with the other vertical stop. Thus, not only is buckling under a lateral force direction that deviates from the longitudinal axis avoided, but also the load-dependent deformation path is still maintained so that the deformation takes place along the longitudinal axis.

Preferably, when the holding element is not under load the stop is arranged approximately parallel to the web extending obliquely in the direction of the first separating wall, in particular the stop encloses an angle of approximately 45°, preferably actually 45° with the longitudinal axis. With this arrangement the previously mentioned behavior of the wheel carrier fastening area relative to the spring fastening area is forced and the rotation, tilting or even pivoting back are selectively achieved thereby.

A holding element with the aforesaid design features and the effects stemming therefrom can be used to good advantage in a vehicle axle with a leaf spring. In particular, such a holding element is suitable for a wheel-guiding leaf spring with which the lateral forces are not taken up or absorbed by additional or by the usual transverse control arms, but by the leaf spring alone.

Preferably, the holding element with the aforesaid design features can be made from continuously-cast light metal. After the continuous casting, depending on the width required having regard to the spring to be used a holding element of appropriate width can be cut or separated from the strand. This constitutes an inexpensive production method for a particularly advantageous component for a wheel-guiding leaf spring.

Preferably, the wheel carrier fastening area comprises a mounting such as a rubber mounting for connecting or articulating the wheel carrier to the holding element. The connection is in particular an elastic connection. Such a mounting serves to fasten the wheel carrier movably to the holding element so that, for example, in combination with the wheel-guiding spring or transverse leaf spring, the wheel can be guided and/or steered by way of the holding element.

In this case the mounting can be held by friction force or interlock in a preferably annular holder formed by the holding element.

The holding element can be part of a McPherson rear axle with a wheel-guiding transverse leaf spring. However, the holding element can also be used in other axle designs with wheel-guiding transverse leaf springs or longitudinal leaf springs and spring links or other chassis components or assemblies, in particular made from composite materials, especially fiber composite materials such as fiber-reinforced plastics.

BRIEF DESCRIPTION OF THE DRAWINGS

Below, the invention is described with reference to preferred embodiments illustrated in the drawing, which shows.

DETAILED DESCRIPTION OF THE PREFERRED EMBODIMENTS

Figure 1:
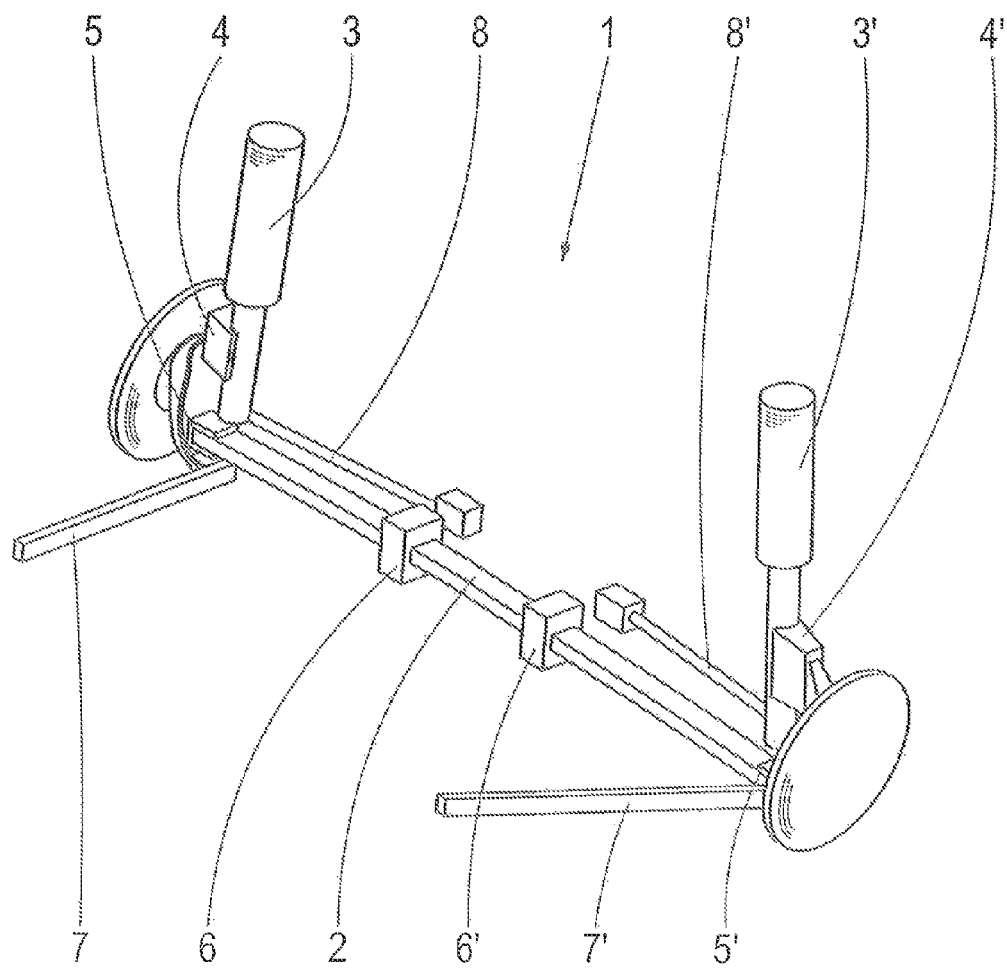
FIG. 1: A chassis,
FIGS. 2a, b, c: A holding element according to the prior art.

FIG. 1 shows a chassis 1 of the type that can be used for example as the rear axle of a passenger car. The chassis has two wheel carriers 4, 4' on which wheels can be fitted by way of wheel bearings. To the wheel carriers 4, 4' are attached in each case a trailing arm 7, 7' and a transverse control arm 8, 8'. In this case the trailing arms 7, 7' extend approximately in the longitudinal or travel direction of the vehicle and the transverse control arms 8, 8' approximately in the transverse direction, i.e. transversely to the travel direction of the vehicle. The transverse control arms and trailing arms are in each case attached at one end to the wheel carriers, while the other end is arranged on the vehicle body.

In addition the chassis 1 has two dampers 3, 3' also attached at one end to the wheel carriers, while the other end of the damper 3, 3' is connected to the body, with overlap.

Whereas the arms 7, 7' and 8, 8' determine the movement path of the wheel carriers 4, 4' relative to the body, for wheel-guiding purposes the dampers additionally damp the movement of the wheels relative to the body when required to do so by the road conditions.

From left to right, the chassis 1 comprises the following components: wheel carrier 4, holder 5, transverse leaf spring 2, trailing arm 7, damper 3, transverse control arm 8, leaf spring holder 6, leaf spring holder 6', transverse control arm 8', damper 3', trailing arm 7', holder 5' and wheel carrier 4'.

The two wheel carriers 4, 4' are connected by way of a spring 2, in particular a transverse leaf spring 2, which preferably consists of a composite material such as glass-fiber-reinforced plastic or fiber-reinforced plastic. The transverse leaf spring 2 extends transversely to the main vehicle axis, i.e. as a rule transversely to the travel direction, and is connected to the vehicle body by two leaf spring holding elements 6, 6', which can be arranged in the middle third of the transverse leaf spring. The transverse leaf spring 2 is connected at its ends to the wheel carriers 4, 4' by means of holders 5, 5'.

FIG. 2a shows an embodiment of a holding element 5 according to the prior art. In this case the webs 24, 25 have a smaller width than the webs 13 and 14 of the spring fastening area, and are connected by further webs 29 to the second separating wall 28 and the first separating wall 34. The webs 29 have the same width or diameter as the webs 24 and 25 and are arranged at an angle to the webs 24 and 25. In this case one web 29' connects the web 24 to the second separating wall 28, one web 29" the web 24 to the first separating wall 34, one web 29''' the web 25 to the second separating wall 28 and one web 29'' '' the web 25 to the first separating wall 34. The webs 29' and 29" and the webs 29''' and 29'' '' are connected to one another respectively and cross at several points. By virtue of the web arrangement an intermediate space 30 is formed in the deformation zone, with an approximately quadrilateral cross-section in the middle, adjacent to six intermediate spaces 31a, 31b, 31c, 31d, 31e, 31f which have approximately triangular cross-sections.

FIG. 2b shows a perspective view of the holding element 5 of FIG. 2a.

FIG. 2c shows a holding element 5 according to FIG. 2a in a deformed condition, after an excessive lateral or transverse force has been applied from the wheel side. In this case the webs are bent outward by different amounts and the intermediate spaces 31a to 31f are differently deformed by compression. It can be seen from all three of FIGS. 2a, 2b and 2c that the components have no longitudinal axis such that the longitudinal axis could be a common axis of symmetry for a component of mirror-symmetrical design.

Figure 3:
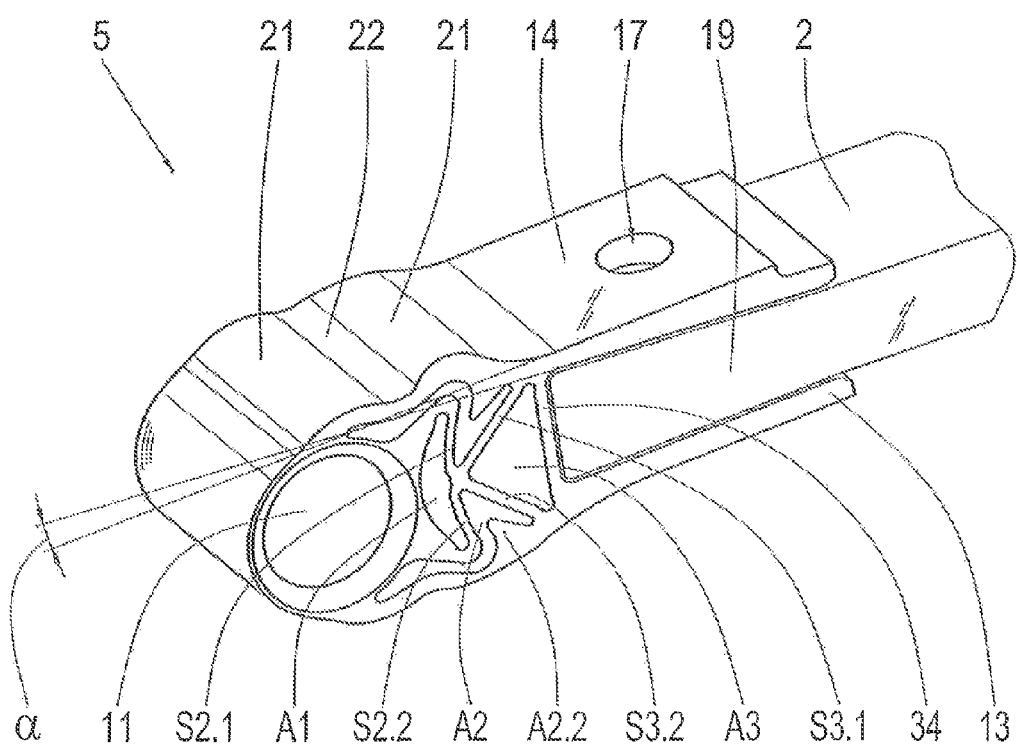
FIG. 3: A holding element according to the invention, in a perspective representation with a transverse leaf spring.

FIG. 3 shows a perspective view of a holding element 5, which is shown with a transverse leaf spring 2 fitted into its spring fastening area. The wheel carrier fastening area extends from the first separating wall 34 to the ends of the webs 13 and 14. The web 14 is wedge-shaped and so enables interlocking, secure gripping of the end of the spring 19. The deformation zone is located between the first separating wall 34 and the opening 11. The deformation zone is followed by the wheel carrier fastening area, which is arranged around the opening 11. In the deformation zone there are various openings, namely a triangular opening A3, a circular-segment-like opening A1 and two wave-shaped openings A2. If the outer contour in the area of the spring fastening area, i.e. the outer contour of the webs 13 and 14 is flat, then farther along in the direction of the wheel carrier fastening area 9 toward the opening 11 it is wave-shaped. From FIG. 3 it can be seen that the wave shape is formed by two wave peaks 21 and a wave trough 22. Within the deformation zone or between the openings A1, A2, A3 are arranged webs S2.1, S2.2, which extend vertically and approximately parallel to the first separating wall 34. The webs have a common crossing point K with the further webs S3.1 and S3.2, which project from the crossing point K outward and obliquely in the direction of the outer contour and in the direction of the first separating wall 34.

Figure 4:
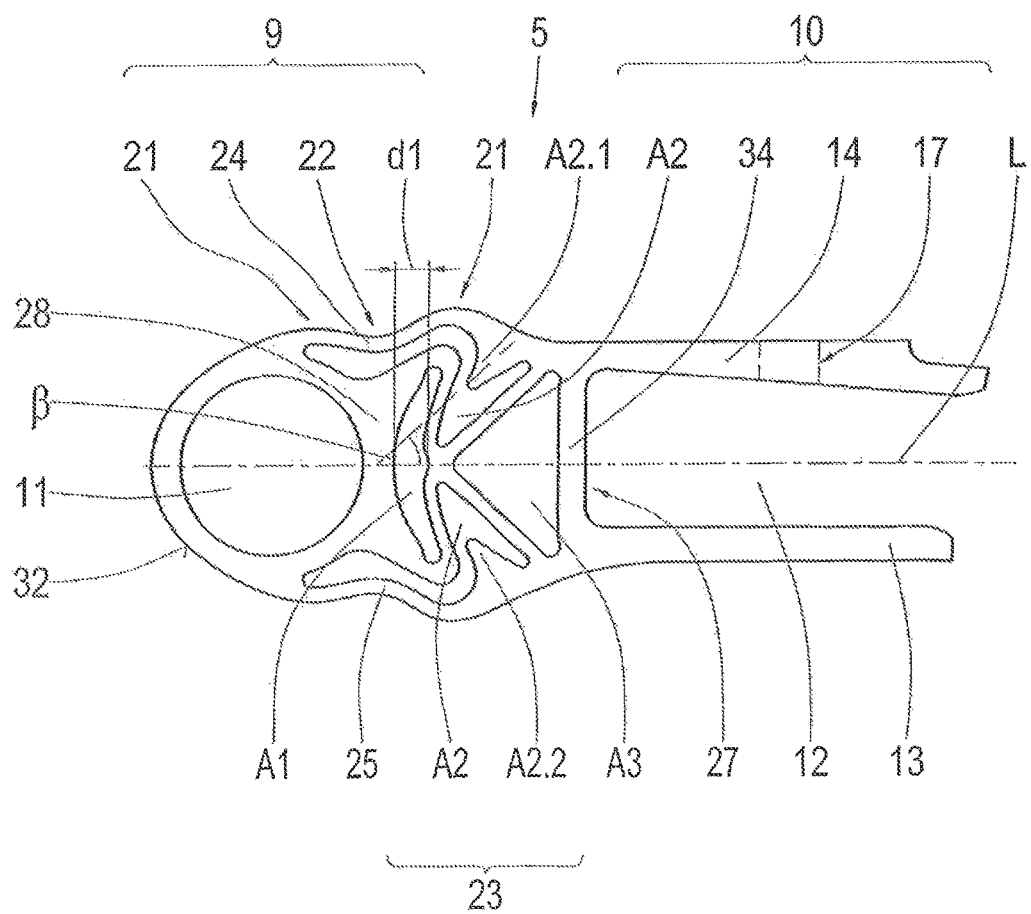
FIG. 4: Side view of the holding element according to FIG. 3,
FIG. 5: A holding element according to FIG. 4 loaded with a lateral or transverse force.

FIG. 4 shows a holding element 5 like the holding element in FIG. 3, a side view of which is shown in FIG. 4. From both FIG. 4 and FIG. 3 it can be seen that there is a through-bore 17 in one of the webs 14. This through-bore serves for the frictional fixing of the end of the transverse leaf spring 19 or the transverse leaf spring 2 in the holding element. A front inside surface 27 is shown, which is provided as a supporting surface or to absorb the lateral forces that act from the wheel carrier, by way of the opening 11, upon the holding element and thus on the transverse leaf spring. As already said in connection with FIG. 3, The spring fastening area 10 extends from the ends of the webs 13 and 14 to the first separating wall 34. The deformation zone extends from the first separating wall 34 to the second separating wall 28 and is delimited on the outside by the webs 24 and 25 which, as already said in connection with FIG. 3, are provided with an external wave shape with wave peaks or raised areas 21 and a wave trough or depression 22 between them. Finally, the wheel carrier fastening area extends from the second separating wall 28 to the outer contour 32, which is in the form of a circular arc that merges into the raised area or wave peak 21. In the area of the outer contour 32 the contour, with its circular arc, runs parallel to the opening 11. The holding element 5 has a longitudinal axis L which is at the same time the axis of symmetry for the largely mirror-symmetrical holding element 5. The holding element 5 is a component of mirror-symmetrical design, wherein the mirror symmetry of the webs 13 and 14 only relates to their outer contours. The deformation zone starting from the first separating wall 34 as far as the outer contour 32 is designed completely mirror-symmetrically. As can also be seen from FIG. 3, between the openings A2 and the outer contour of the webs 24 and 25 are arranged stops A2.1 and A2.2. As represented in the drawing, the stops are more or less in their rest position. They project into the openings A2 and form with the longitudinal axis L an angle R of approximately 45°. In this context reference to the rest position of the stops A2.1 and A2.2 means that as a whole FIG. 4 shows a holding element in the unloaded or normally loaded operating range (the standard loading case). In the normal operating range the holding element 5 is not deformed permanently but reacts to lateral forces in an elastic manner. Only under high loads, i.e. lateral forces which can be said to be an abusive misuse, does the holding element deform plastically, i.e. permanently, as illustrated in the later figures. Furthermore, FIG. 4 shows within the opening A1 a diameter d1, whose size corresponds to the undeformed state.

Figure 5:
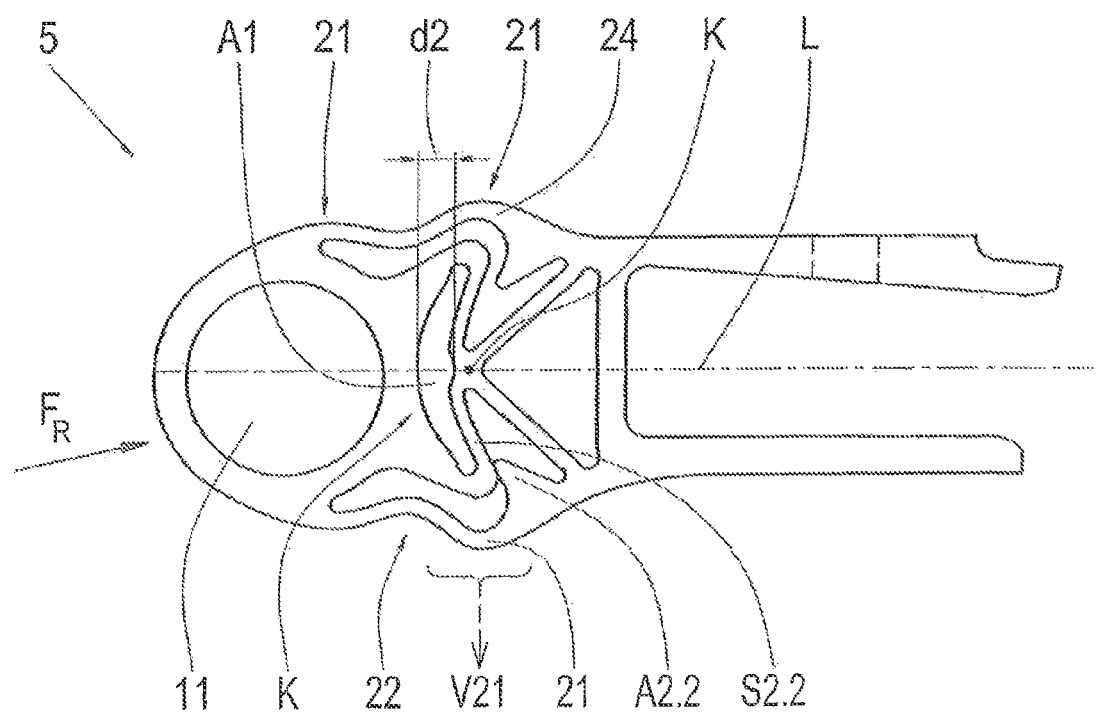

FIG. 5 shows a side view corresponding to FIG. 4, in which a lateral force $F_R$ in the load range corresponding to an abusive misuse has acted on the holding element 5. It can be seen that the load is approximately parallel to the longitudinal axis L. In the first place it is evident that the crossing point K of the struts S2.1, S2.2, S3.1, S3.2 remains on the longitudinal axis. The diameter $d_2$ of the opening A1 is smaller compared with the diameter $d_1$ shown in FIG. 4. The stop A2.2 is in contact with the end of the web S2.2 so that the lower opening A2 shown in FIG. 5 in divided by the contact or configuration between the surfaces of the stop A2.2 and the web S2.2. It can also be seen that the wave peak or raised area 21 under the crossing point K has moved away from the longitudinal axis L compared with FIG. 4. The deformation V21 can be seen clearly, since the lower peak 21 projects substantially farther from the longitudinal axis L than does the upper peak 21 above the crossing point K, so that in this condition the holding element 5 is no longer mirror-symmetrical relative to the longitudinal axis L.

Figure 6:
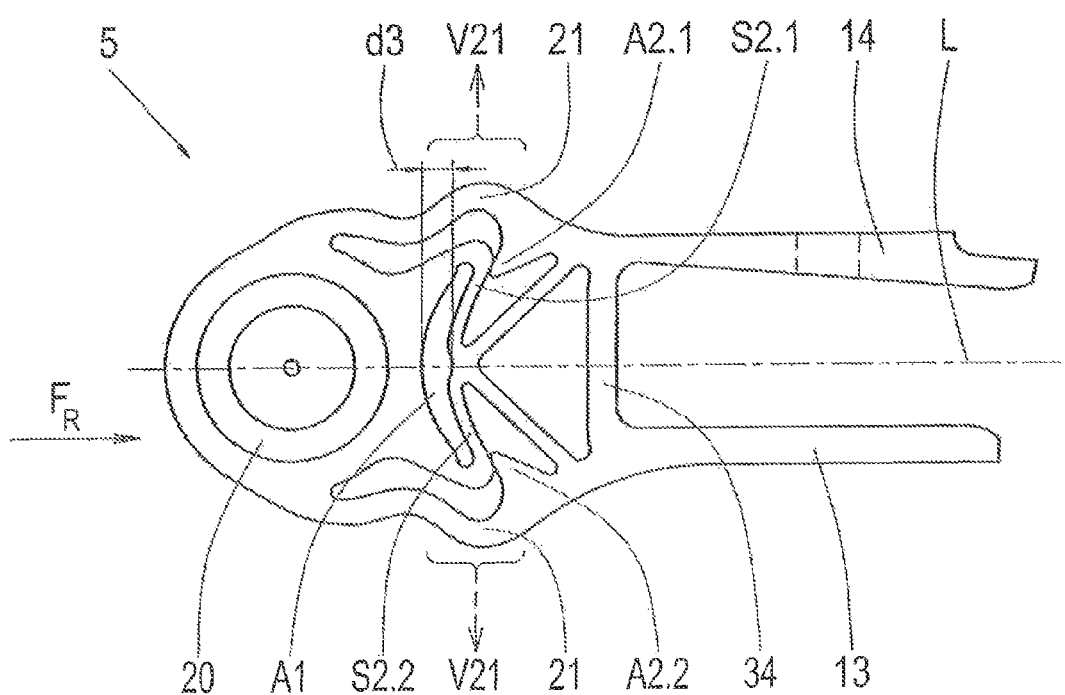
FIG. 6: A further loaded holding element according to FIG. 5.

FIG. 6 shows the holding element of FIG. 5 after the further action of an abusive misuse load (lateral force $F_R$). The diameter $d_3$ of the opening A1 is substantially smaller than in the representation in FIG. 5. In the wheel carrier fastening area 9 and the deformation zone 23 the holding element 5 is now again symmetrical relative to the longitudinal axis L. The humps 21 above and below the crossing point K are now equally deformed, since in the condition shown both stops A2.1, A2.2 have come in contact with the vertical webs S2.1 S2.2. In the condition shown in FIG. 1 a deformation has taken place in such manner that the opening 11 to which the wheel carrier is articulated has moved approximately 3 mm toward the first separating wall 34. It can be seen that due to the abusive misuse load, the holding element has deformed in accordance with a predetermined deformation path. No buckling of the wheel carrier fastening area relative to the spring fastening area or relative to the spring has taken place. This is because by virtue of the design of the webs S2.1, S2.2, 24, 25 and the openings A1, A2, A3, an intended deformation path can occur when abusive misuse loads are applied to the holding element 5 or to the transverse leaf spring 2. During this the webs S3.1 and S3.2 act as compression struts while the webs S2.1 and S2.2 act as tension struts. In FIG. 6 a rubber mounting 20 is shown, which is pressed into the opening 11 in the wheel carrier fastening area. By means of the rubber mounting 20 an articulated connection from the wheel carrier fastening area to the wheel carrier is formed.

It is understood that the above-mentioned features of the invention can be used not only in the combination indicated in each case, but in other combinations as well, or in isolation, without going beyond the scope of the invention. Likewise, it is within the scope of the invention to mechanically reverse the functions of the individual mechanical elements of the invention.

INDEXES

1 Chassis
2 Transverse leaf spring
3, 3' Dampers
4, 4' Wheel carriers
5, 5' Holding elements
6, 6' Leaf spring holders
7, 7' Trailing arms
8, 8' Transverse control arms
9 Wheel carrier fastening area
10 Spring fastening area
11 Opening
12 Holder
13 Web
14 Web
15 Inner surface
16 Inner surface
17 Through-bore
19 End of the spring
20 Rubber mounting
21 Raised area, wave peak
22 Depression, wave trough
23 Deformation zone
24 Web
25 Web
26 Outer surface
27 Front inner surface
28 Second separating wall
29 Wall
29' Wall
29" Wall
29''' Wall
29'''' Wall
31a Intermediate space
31b Intermediate space
31c Intermediate space
31d Intermediate space
31e Intermediate space
31f Intermediate space
32 Outer contour
34 First separating wall
A1 Opening
A2 Opening
A3 Opening, triangular
A2.1 Stop
A2.2 Stop
A3 Opening
d1 Diameter
d2 Diameter
d3 Diameter
S2.1 Web
S2.2 Web
S3.1 Web
S3.2 Web
V21 Deformation
K Crossing point
L Longitudinal axis, axis of symmetry
α Wedge angle
β Angle

The invention claimed is:
1. A holding element for a spring, the holding element comprising:
  a spring fastening area (10) for fastening the spring (2) to the holding element (5) and a wheel carrier fastening area (9) for fastening a wheel carrier (4) to the spring (2),
  a deformation zone (23) in which a plurality of webs and a plurality of openings extend for transmission of forces from the spring fastening area (10) to the wheel carrier fastening area (9), and the plurality of openings including a first opening and a second opening, and
  the plurality of webs (S2.1, S2.2, S3.1, S3.2) and the plurality of openings (A1, A2, A3) being arranged mirror-symmetrically relative to a longitudinal axis (L)

of the holding element such that the first and the second openings are symmetrical relative to the longitudinal axis.

2. The holding element for the spring according to claim 1, wherein an outer contour (21, 22, 23) of the holding element (5), at least in a front area facing away from a first separating wall (34), is formed mirror-symmetrically relative to the longitudinal axis (L).

3. The holding element for the spring according to claim 1, wherein an outer contour has two raised areas (21), facing away from the longitudinal axis, and a depression (22), between the two raised areas, faces toward the longitudinal axis.

4. The holding element for the spring according to claim 1, wherein the plurality of webs (S2.1, S2.2, S3.1, S3.2) are arranged between the wheel carrier fastening area (9) and the spring fastening area (10), and the first and the second openings (A2) of the plurality of openings extend at least partially into the wheel carrier fastening area (9).

5. The holding element for the spring according to claim 1, wherein the plurality of webs (S2.1, S2.2, S3.1, S3.2) form a cross, such that first and second webs of the plurality of webs (S2.1, S2.2) extend from a common crossing point (K) at first in an approximately vertical direction and then continue in a direction of a second separating wall (28), merging into the second separating wall, while third and fourth webs of the plurality of webs (S3.1, S3.2) extend from the crossing point (K) at an angle of approximately 45° with respect to the longitudinal axis toward a first separating wall (34), and the crossing point (K) is located along the longitudinal axis (L).

6. The holding element for the spring according to claim 5, wherein vertical portions of the first and the second webs (S2.1, S2.2) and the third and the fourth webs (S3.1, S3.2) that project in a direction toward the first separating wall (34) are at least approximately of equal material thickness.

7. The holding element for the spring according to claim 5, wherein, when a lateral force (FR) acts upon the wheel carrier fastening area (9), vertical portions of the first and the second webs (S2.1, S2.2) act as tension struts and the third and the fourth webs (S3.1, S3.2), projecting in a direction toward the first separating wall (34), act as compression struts.

8. The holding element for the spring according to claim 5, wherein, starting from the crossing point (K) and as far as the first separating wall (34), the first opening (A3) of the plurality of openings in a shape of an approximately equilateral triangle is formed, the crossing point being an apex of the triangular opening and one side of the first opening (A3), opposite from the crossing point extends approximately vertically and parallel to the first separating wall (34).

9. The holding element for the spring according to claim 8, wherein, on a side of the holding element facing away from the triangular first opening (A3) between the second separating wall (28) and the first and the second vertical webs (S2.1, S2.2), a circular-segment opening (A1) is formed and delimited by the second separating wall and the vertical portions of the first and the second webs, and starting from ends of the vertical portions of the first and the second webs (S2.1, S2.2), a circular section of the first and the second webs extends in a direction toward the wheel carrier fastening area (9).

10. The holding element for the spring according to claim 9, wherein the circular section of the first and the second webs extends at least one of parallel to an outer contour of the holding element and parallel to an opening (11) in the wheel carrier fastening area.

11. The holding element for the spring according to claim 5, wherein two openings of the plurality of openings (A2) extend from the wheel carrier fastening area (9), beginning approximately parallel to an outer contour of the holding element, into the deformation zone (23), so that the two openings (A2) extend as far as an area between vertical portions of the first and the second webs (S2.1, S2.2) and the third and the fourth webs (S3.1, S3.2) that project in a direction toward the first separating wall (34).

12. The holding element for the spring according to claim 11, wherein a stop (A2.1, A2.2) projects into each of the two openings (A2) between the plurality of webs (S2.1, S2.2, S3.1, S3.2), the stops (A2.1, A2.2) are arranged mirror-symmetrically relative to the longitudinal axis (L), and the stops (A2.1, A2.2) cooperate with an end area of the respective vertical portion of the first and the second webs (S2.1, S2.2) when a lateral force (FR) acts upon the wheel carrier fastening area (9).

13. The holding element for the spring according to claim 11, wherein each of a pair of stops (A2.1, A2.2) is functionally connected to a respective outer web (24, 25) and is formed integrally with the respective outer web, and an outer contour of each of the pair of stops (A2.1, A2.2) and an inner contour between the vertical portion of the first and the second webs (S2.1, S2.2) and the fourth and the third webs, projecting in a direction toward the first separating wall (34), extend approximately parallel.

14. The holding element for the spring according to claim 12, wherein, when the holding element (5) is not under load, each of the pair of stops (A2.1, A2.2) is arranged approximately parallel to the respective third and the fourth webs (S3.1, S3.2), and enclose, with the longitudinal axis (L), an angle of at least approximately 45°.

15. The holding element for the spring according to claim 1, wherein the plurality of webs and the plurality of openings are deformable to absorb forces exceeding a limit value that are transmitted to the deformation zone from one of the wheel carrier fastening area and the spring fastening area toward the other one of the wheel carrier fastening area and the spring fastening area.

16. A holding element in combination in a vehicle axle having a wheel-guiding leaf spring, the holding element comprising:
a spring fastening area (10) for fastening the leaf spring (2) to the holding element (5) and a wheel carrier fastening area (9) for fastening a wheel carrier (4) to the leaf spring (2),
a deformation zone (23) in which webs, and openings extend for transmission of forces from the spring fastening area (10) to the wheel carrier fastening area (9),
the webs (S2.1, S2.2, S3.1, S3.2) and the openings (A1, A2, A3) are mirror-symmetrical relative to a longitudinal axis (L) of the holding element,
one of the openings has a form of an equilateral triangle with a base of the triangular opening facing the spring fastening area and an apex of the triangular opening facing the wheel carrier fastening area and being located on the longitudinal axis of the holding element.

17. A method for producing a holding element for a leaf spring, the holding element having a spring fastening area (10) for fastening the spring (2) to the holding element (5) and a wheel carrier fastening area (9) for fastening a wheel carrier (4) to the spring (2), a deformation zone (23) in which a plurality of webs and a plurality of openings extend for transmission of forces from the spring fastening area (10) to the wheel carrier fastening area (9), and the plurality of webs (S2.1, S2.2, S3.1, S3.2) and the plurality of openings (A1, A2, A3) are formed mirror-symmetrically relative to a longitudinal axis (L) of the holding element, the method comprising:
- forming the holding element from continuously-cast light metal;
- arranging a separating wall vertically such that the separating wall axially separates the spring fastening area from the deformation zone and the wheel carrier fastening area;
- arranging a first and second webs of the plurality of webs in the deformation zone such that one end of the first web is connected to one end of the second web at a crossing-point that is located on the longitudinal axis, and opposite ends of the first and the second webs are connected to opposite ends of the separating wall; and
- arranging the first and the second webs and the separating wall so as to define one of the plurality of openings shaped as an isosceles triangle, the separating wall defining a hypotenuse of the triangular opening and the crossing-point defining an apex of the triangular opening.

18. The holding element for the spring according to claim 15, wherein the plurality of webs and the plurality of openings form an intended deformation path when the forces exceeding the limit value are transmitted to the deformation zone.

* * * * *